UNITED STATES PATENT OFFICE.

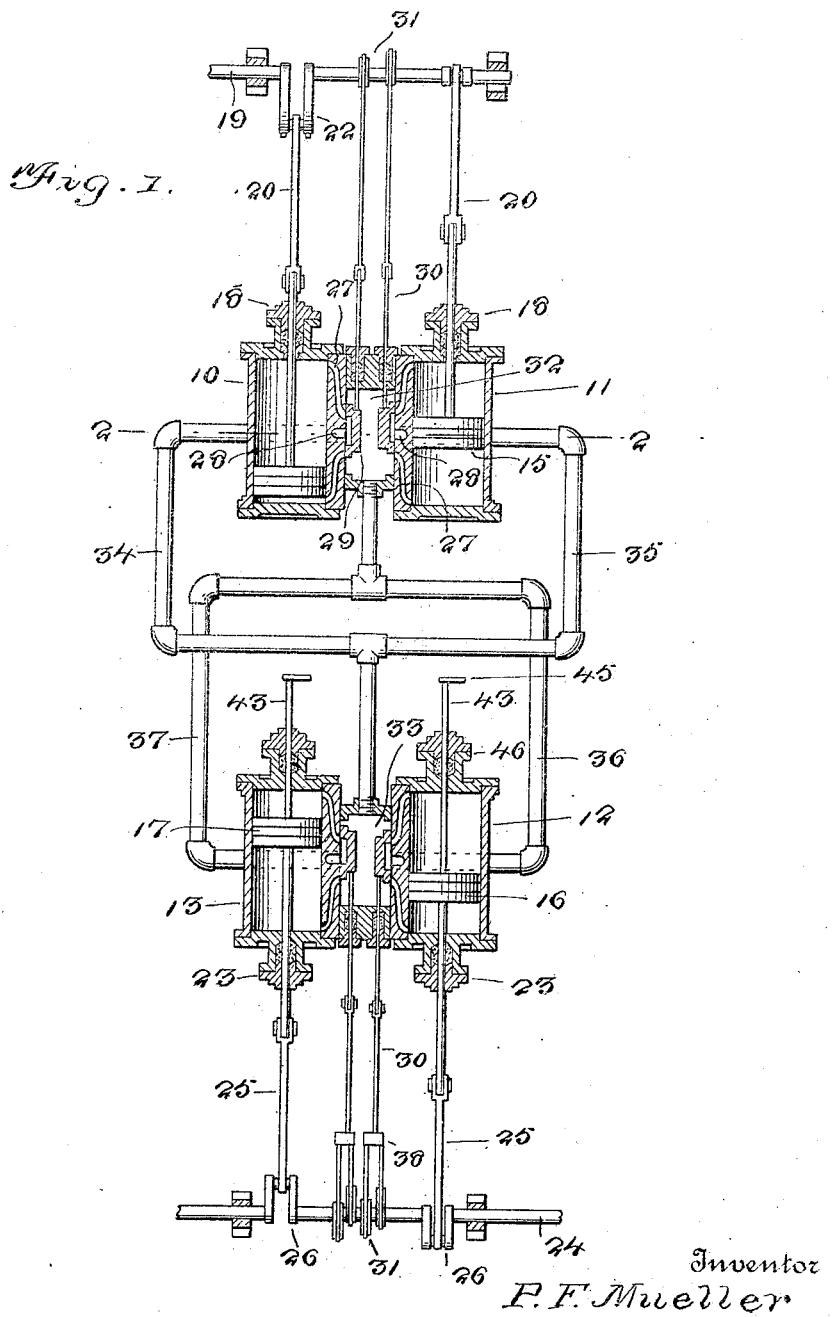

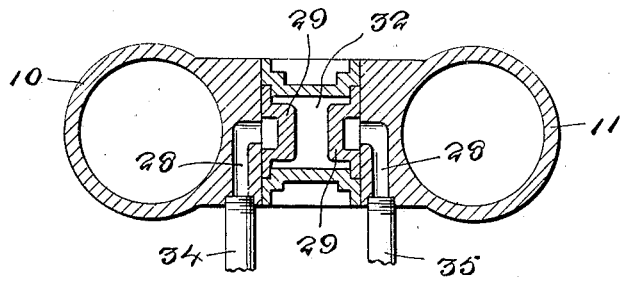
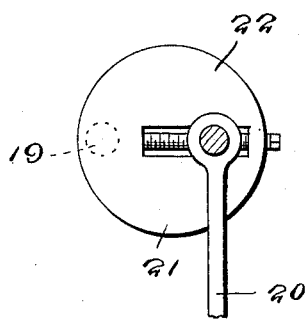
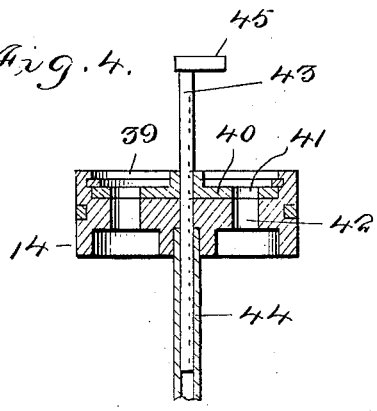
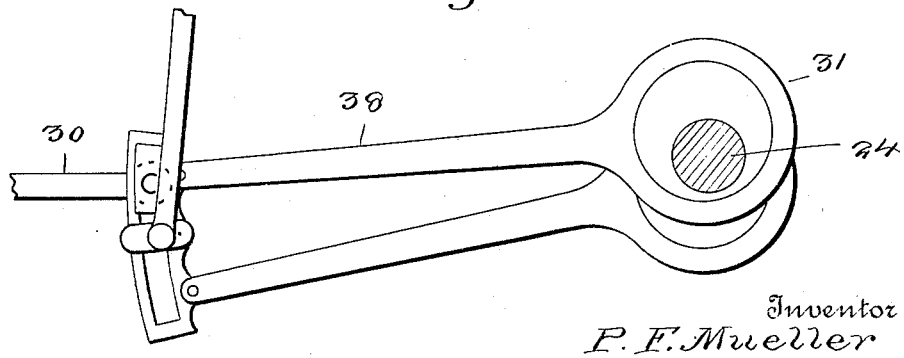

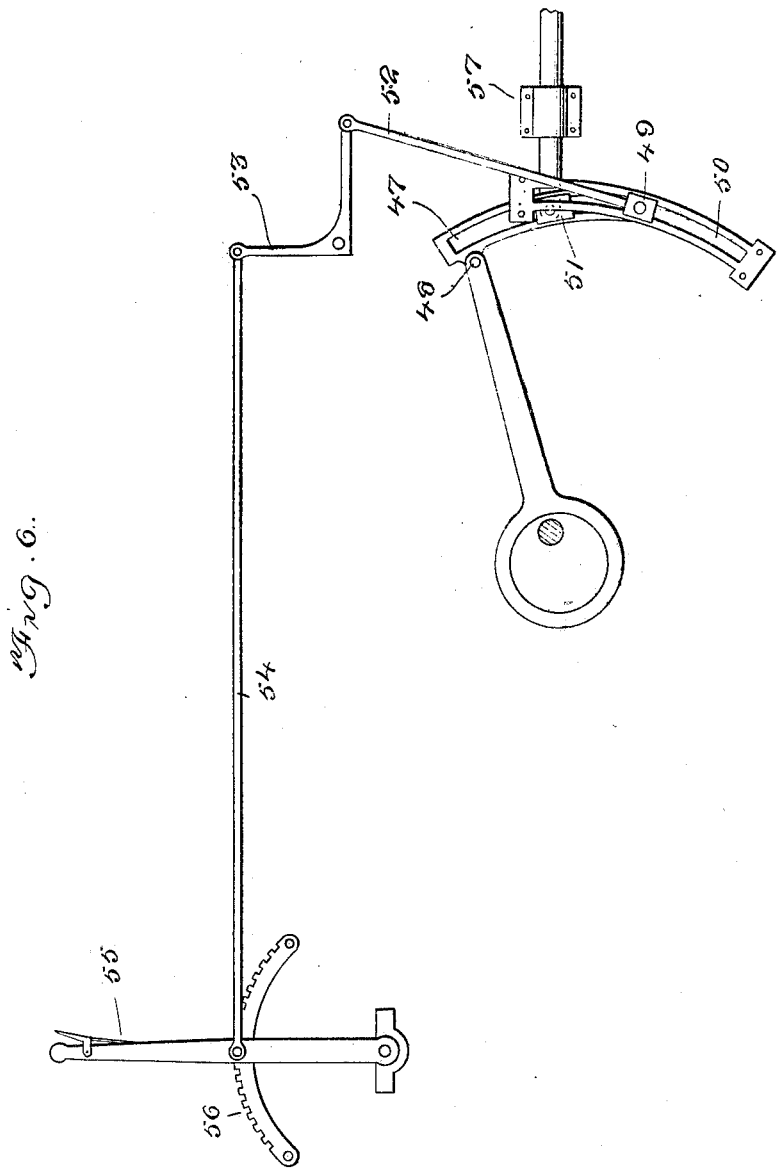

PAUL F. MUELLER, OF NORFOLK, VIRGINIA, ASSIGNOR TO NORFOLK POWER APPLIANCE CORPORATION, A CORPORATION OF THE UNITED STATES.

TRANSMISSION MECHANISM.

1,374,154.     Specification of Letters Patent.     Patented Apr. 5, 1921.

Application filed March 24, 1919. Serial No. 284,584.

*To all whom it may concern:*

Be it known that I, PAUL F. MUELLER, a citizen of the United States, residing at Norfolk, in the county of Norfolk and State of Virginia, have invented new and useful Improvements in Transmission Mechanism, of which the following is a specification.

This invention relates to transmission mechanisms and has for an object the provision of a fluid transmission which is simple and economical of construction, positive in operation and by means of which power may be transmitted from a drive to a driven shaft and the speed of the latter regulated.

Another object of the invention is to provide means for regulating the speed transmitted to the driven shaft by regulating the stroke of the operating pistons, which regulation is obtained by an exceedingly small adjustment to be made during the operation of the mechanism. By this means, the speed of the driven shaft may be gradually increased under a heavy load without subjecting the motor or other driving means to sudden strain.

Another object is to provide a transmission mechanism by means of which the direction of rotation of the driven shaft may be reversed during the operation of the latter.

A further object is to provide a transmission mechanism, which may be placed at neutral, when no motion will be imparted to the driven shaft, thereby avoiding the use of clutches for the purpose of connecting and disconnecting the drive shaft from the driven shaft.

A still further object of the invention is the provision of a mechanism of this character which will eliminate the use of brakes when applied to a motor vehicle.

Other objects and advantages of the invention will appear as the following description is read in connection with the accompanying drawings.

In the drawings:

Figure 1 is a sectional view showing the transmission mechanism connecting a drive shaft to a driven shaft, the connections between the various cylinders of the mechanisms being indicated by dotted lines.

Fig. 2 is a transverse sectional view on the line 2—2 of Fig. 1.

Fig. 3 is an enlarged view illustrating the means for adjusting the throw of the crank shaft or travel of the piston for the purpose of regulating the speed of the driven shaft.

Fig. 4 is a detail view of the piston valve.

Fig. 5 is a similar view of the reversing mechanism.

Fig. 6 is a view illustrating a different form of means for regulating the speed of the driven shaft.

Referring to the drawings in detail, like characters of reference denote corresponding parts throughout the several views.

The transmission mechanism which constitutes the present invention, may be used in any connection where it is desirable to vary the relative speeds of a drive and driven shaft, the invention being especially applicable to motor driven vehicles.

The invention includes a plurality of cylinders herein shown as four and indicated by the numerals 10, 11, 12 and 13. Operating in these cylinders are pistons 14, 15, 16 and 17, the rods of the first two mentioned pistons operating through stuffing boxes 18 and being connected to a drive shaft 19 through the medium of pitmen 20. The shaft 19 may be the crank shaft of an internal combustion engine or other motor, or may be driven from the shaft of such engine or motor, as desired. The pitmen 20 are connected to a power shaft of any character, such as the crank shaft through the medium of an adjustable screw connection 21 and eccentrics 22. The purpose of this is to permit of a gradual adjustment of the throw of the eccentrics for the purpose of regulating the travel of the pistons 14 and 15 within the cylinders 10 and 11.

It is not the purpose of the present application to limit the invention to the particular construction of adjusting means herein shown and described, as this adjustment may be governed according to conditions under which the invention is used. For use in automobiles the adjusting means have suitable operating means within reach of the driver of the vehicle, so that the adjustment may be conveniently made from the driver's seat.

The pistons 16 and 17 of the cylinders 12 and 13 have their rods passing through stuffing boxes 23 and connected to the driven shaft 24 through the medium of pitmen 25 and crank arms 26. In the case of a motor vehicle the shaft 24 may represent the rear or driving axle of the wheel.

The cylinders 10, 11, 12 and 13 are designed to be filled with a suitable fluid, for example, compressed air furnished by a suitable air pump (not shown), which may be carried by the vehicle and provided with an automatic shutoff valve, so as to keep the cylinders properly supplied with compressed air.

The cylinders are provided with suitable inlet ports 27 and outlet ports 28, which are controlled by valves 29, herein shown as slide valves and operated through the medium of valve rods 30, connected to the shafts 19 and 24 by means of eccentrics 31. The cylinders are arranged in pairs with the valves of the cylinders 10 and 11 connected to and operated by the shaft 19, while the valves of the cylinders 12 and 13 are connected to and operated by the shaft 24. The valves of the cylinders 10 and 11 operate in a suitable valve chamber 32 arranged between the cylinders and communicating with the interior thereof through the medium of the ports 27, while the valves of the cylinders 12 and 13 likewise operate in a similar valve chamber 33, which communicates in like manner with the interior of the said cylinders.

The exhaust port of the cylinder 10 is connected to the valve chamber 33 through the medium of a pipe 34, while the exhaust port of the cylinder 11 is connected to the same valve chamber through the medium of a pipe 35, the valves being to timed that when air is exhausted from the cylinder 10 through the operation of the piston 14, it will pass through the pipe 34 into the valve chamber 33 and enter the cylinder 12 through one of the intake ports 27, the valve of this cylinder having reached a proper position to permit of this passage, while the valve of the cylinder 13 will be so positioned as to cover the entrance of both intake ports of the cylinder 13. In a similar manner air will be forced by the piston 15 of the cylinder 11 through the exhaust port 28 and the pipe 35 into the valve chamber 13, the valves in this chamber having assumed a reverse position to that previously described, so that entrance of air into the cylinder 12 is prevented and air is forced into the cylinder 13 through the intake ports 27. The air alternately entering the cylinders 12 and 13 will operate the pistons therein to force the air through the respective exhaust ports and through pipes 36 and 37, which lead respectively from the cylinder 13 to the valve chamber 32 and from the cylinder 12 to the valve chamber 32, the valve being positioned as to admit air from the pipe 36 or the cylinder 13 to the cylinder 10 and from the pipe 37 or the cylinder 12 to the cylinder 11, so that air is constantly forced under pressure from the cylinder 10 to the cylinder 12 and from the cylinder 11 to the cylinder 13 and back again from 12 to 10 and from 13 to 11.

By adjusting the stroke of the pistons 14 and 15 a gradual change of speed is obtainable. For example, let it be supposed that the vehicle within which the transmission device is installed is at a standstill with the engine running and the cranks 22 adjusted to a stroke equal to zero, that is to a stroke which keeps the pistons in the cylinders 10 and 11 in a stationary position, now it is assumed that all cylinders, valve chambers, connecting pipes and ports are filled with fluid. Should the vehicle be pushed forward, the shaft 24 will have a tendency to turn and by means of the crank arms 26, tend to drive the pistons 16 and 17. With the moving of these pistons, the fluid in the part of the cylinders 12 and 13 which is in front of the pistons will have been forced out through the ports 27 in the cylinders 12 and 13 through pipes 36 and 37 to enter the valve chamber 32.

In order that the fluid may continue moving away from the pressure, it will have to enter inlet ports 27 and through these ports enter cylinders 10 and 11. However, before the fluid again enters these cylinders it will be necessary for the fluid already in said cylinders to be forced out. With the pistons 14 and 15 stationary and the slide valves in the position indicated on the drawings, the fluid in the cylinders 10 and 11 has no exit and consequently there can be no movement of the pistons in cylinders 12 and 13. It may also be added that the pistons in cylinders 10 and 11 are stationary in the center of their respective cylinders. With these pistons stationary, the slide valves 29 are alternately closing one intake port and opening the other in the same cylinders. It will be thus seen, that there is no way for the incoming fluid to find an exit since the slide valves 29 will block its exit to outlet ports 28 and because the intake port of the other end of the same cylinder is open to the outlet port. In other words, there is never a communication possible between an intake port open to a valve chamber 32 with its respective outlet port. Consequently, there can be no flow of fluid possible from any cylinder, as the flow is blocked in its circuit through the stationary pistons in the cylinders 10 and 14.

In order to reverse the direction of rotation of the shaft 24, a suitable reversing mechanism may be employed, for example, there is shown an ordinary reversing link mechanism, such as is usually employed in connection with locomotives and indicated at 38 and shown connecting the valve stems of the valves which control the ports of the cylinders 12 and 13 with the shaft 24.

In the use of the mechanism for motor vehicles, it is necessary to provide some means for neutralizing the action of the fluid in the cylinders 12 and 13, so that the vehicle may be manually moved when the motor is idle. For this purpose, each of the pistons 16 and 17 are provided with a chamber 39 in which is mounted for rotation a disk valve 40. This valve is provided with transverse ports 41, which are adapted to be moved into and out of register with similar ports 42 extending through the pistons. Slidably connected to the valve 40 is a rod 43, one end of which extends into a socket 44, provided in the rods of each of the pistons and the opposite end projects through the head of the cylinder and is provided with an operating member 45.

A suitable stuffing box 46 is provided to prevent loss of compression. The valve 40 is normally positioned to obstruct the ports 42 to permit the fluid to act upon the cylinders 16 and 17, but may be rotated so as to bring the ports 41 and 42 into register to permit of the passage of the fluid therethrough without acting upon the pistons. This also permits of the operation of the pistons within the cylinders 10 and 11 without imparting motion to the shaft 24.

It will thus be seen from the foregoing description and accompanying drawings, that the invention provides a transmission which when used upon motor vehicles will admit of a wide variation of speed without the use of the usual gear shifts and will enable the vehicle to run backward at the same speed as forward.

It is also apparent that air is always under compression, which eliminates the generation of heat at the expense of the power production of the motor, while in fluid transmissions as heretofore constructed, the air is relieved of compression at certain stages and again re-compressed at certain other intervals, which places additional work on the motor and results in reducing its power.

In Fig. 6 there is illustrated another and preferred form of means for regulating the speed of the driven shaft. This consists of pivotally securing the pitmen 20 to an arcuate link 47, the point of connection being located adjacent one end of the link, as at 48. The opposite end of the link has pivotally secured thereto a block 49, which operates in an arcuate shaped stationary guide 50. Slidably mounted within the link 47 is a block 51, which has pivotally secured thereto the outer end of a piston rod carried by one of the pistons 15, so that an adjustment of the block 49 within the guide 50 will regulate the throw or degree of travel of the said pistons. This regulation is effected through the medium of a rod 52, one end of which is pivotally secured to the block 49 and the opposite end to one arm of a bell crank lever 53, the latter being actuated by a rod 54, which is removable through the medium of a hand lever 55, adjustable on a segment 56. The hand lever 55 may in the case of a motor vehicle be located within convenient reach of the driver. A guide 57 is provided for the piston rod to maintain proper alinement.

The invention is susceptible of various changes in its form, proportions and minor details of construction and the right is herein reserved to make such changes as properly fall within the scope of the appended claims.

Having described the invention, what is claimed is:

1. The combination with a drive shaft and a driven shaft, of fluid contained cylinders, pistons operating within said cylinders, means for connecting the pistons to the drive shaft, other fluid contained cylinders, pistons operating within the latter, means for connecting the last mentioned pistons to the driven shaft, means whereby the fluid may be alternately forced from one set of cylinders to the other to impart motion from the drive shaft to the driven shaft and means including piston carried valves whereby the action of the fluid in the second mentioned cylinders may be neutralized to stop the operation of the pistons in the said second mentioned cylinders.

2. The combination with a drive shaft and a driven shaft, of a pair of fluid contained cylinders, pistons operating within said cylinders, means for connecting the pistons and the drive shaft to operate the former, another pair of fluid contained cylinders, pistons operating within the latter, means for connecting the last mentioned pistons to the driven shaft, a valve chamber interposed between the cylinders of each pair, means for establishing communication between the cylinders of each pair and the valve chamber of the opposite pair of cylinders, and drive and driven shaft operated valves for each pair of cylinders to control communication between the cylinders and their respective valve chamber, whereby the fluid may be alternately forced from one pair of cylinders to the other to impart motion from the drive to the driven shaft.

In testimony whereof I affix my signature.

PAUL F. MUELLER.